(12) United States Patent
Giebel et al.

(10) Patent No.: US 6,283,114 B1
(45) Date of Patent: Sep. 4, 2001

(54) TENTED GAS BURNER FOR GRILL

(75) Inventors: Michael Giebel; Daniel M. Stewart, both of Joplin; Don Freber, St. Louis, all of MO (US); Robert Minor, Gilbertville, KY (US); Henry Schubert, Neosho, MO (US)

(73) Assignee: Sunbeam Products, Inc., Boca Raton, FL (US)

( * ) Notice: Subject to any disclaimer, the term of this patent is extended or adjusted under 35 U.S.C. 154(b) by 0 days.

(21) Appl. No.: 09/373,825

(22) Filed: Aug. 13, 1999

(51) Int. Cl.[7] .................... A47J 37/00; F23D 14/62; F23D 14/04; F23D 14/08; F24C 3/00
(52) U.S. Cl. ............. 126/41 R; 126/39 K; 431/354; 99/425; 99/444; 99/447
(58) Field of Search ................ 126/25 R, 41 R, 126/39 K, 90 R, 332; 99/425, 445, 447, 444, 600, 500, 446; 431/354

(56) References Cited

U.S. PATENT DOCUMENTS

| | | | |
|---|---|---|---|
| 5,121,676 | * 6/1992 | Jurgens ...................... | 126/41 R |
| 5,347,978 | * 9/1994 | Zuran ........................ | 126/41 R |
| 5,453,574 | * 9/1995 | Zuran et al. ................ | 126/41 R |
| 5,481,965 | * 1/1996 | Kronman .................... | 126/41 R |

FOREIGN PATENT DOCUMENTS

| | | | |
|---|---|---|---|
| 0166777 | * 4/1981 | (NL) ...................... | 431/354 |
| 2301026 | * 4/1981 | (DE) ...................... | 431/354 |

* cited by examiner

*Primary Examiner*—Carl D. Price
(74) *Attorney, Agent, or Firm*—Kramer Levin Naftalis & Frankel LLP.

(57) ABSTRACT

A grill having a bi-level tent configuration, a burner assembly and a grill shell. The lower, first tent has an "I"-shaped configuration. The upper, second tent has a plurality of openings. The burner assembly is formed from stamped metal. The upper piece of stamped metal has a raised or embossed area with multi-level ports. The burner and tent arrangement provides even distribution of heat to the cooking surface and flare-up control. The use of stamped metal for the burner assembly provides for a cost efficient and easy to assemble grill.

24 Claims, 6 Drawing Sheets

TENTED GAS BURNER FOR GRILL

FIELD OF THE INVENTION

The present invention relates to gas barbecue grills generally and more particularly to burners and tented burners for grills.

BACKGROUND INFORMATION

In general, it is known to use tented burners in barbecue grills. However, presently available barbecue grills have several disadvantages. For example, known tented burner arrangements are ineffective in providing an optimum and even distribution of heat to the cooking surface of the grill. In addition, presently available grills do not effectively control flare-ups, as are commonly caused by drippings onto the burner or the tent arranged above the burner.

SUMMARY OF THE INVENTION

The present invention provides a grill having a tent structure mounted over a gas burner. The tent structure is configured in such a way as to allow the periphery of the cooking surface to achieve a higher temperature than that allowed by conventional tented burner arrangements, thereby providing an even distribution of heat to the cooking surface of the grill.

The present invention also provides a grill having a tent or combination of tents to provide improved flare-up control.

In addition, the present invention provides a gas grill having a stamped sheet metal burner assembly with top-side, multi-level porting to enhance even distribution of heat across the cooking surface. This results in a low-volume, efficient burner having a longer operating lifespan. Moreover, the use of sheet metal components provides substantial cost and assembly benefits.

DETAILED DESCRIPTION

Figure 1:
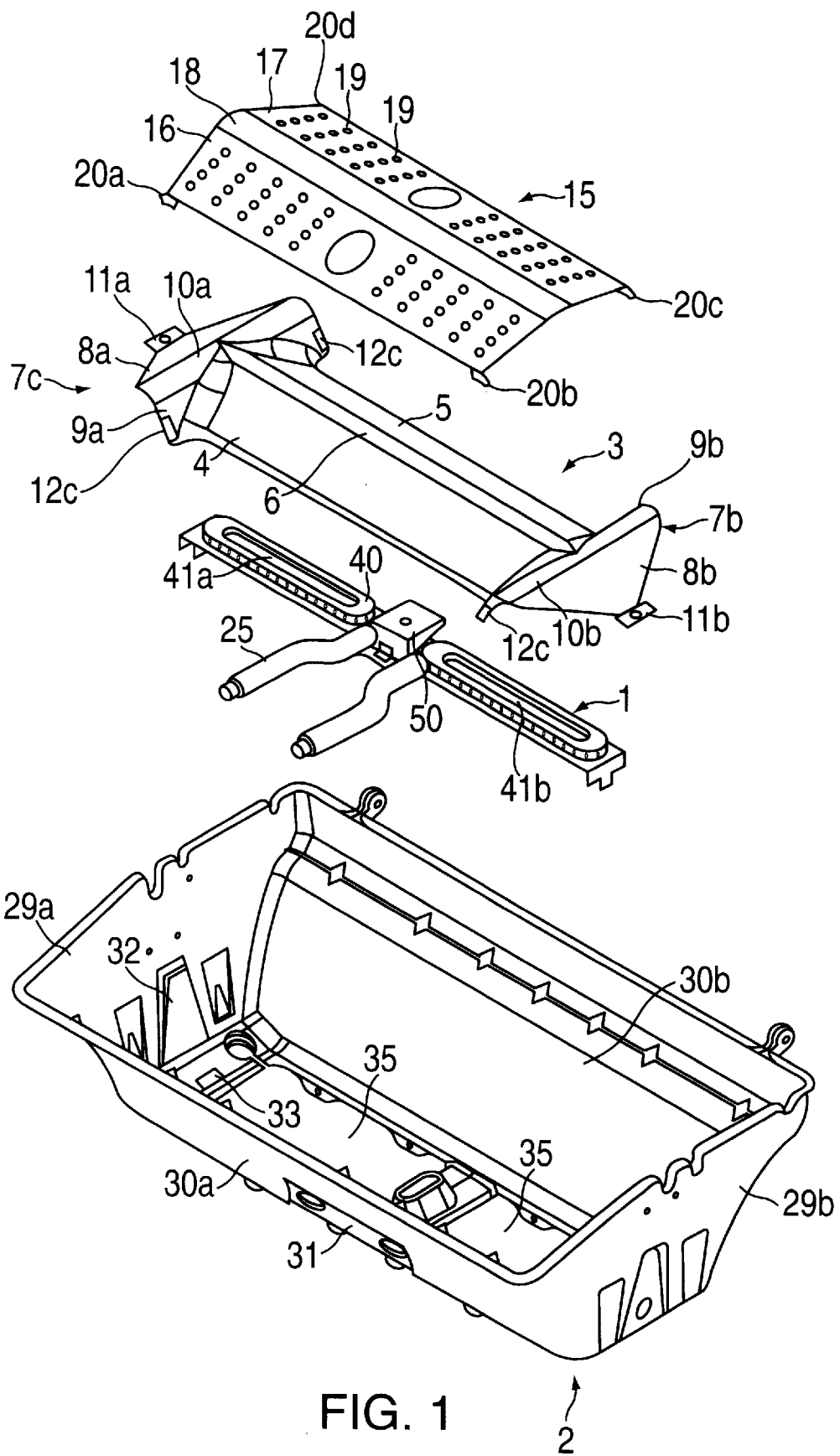
FIG. 1 is an exploded perspective view of an exemplary embodiment of a grill in accordance with the present invention.
Figure 2:
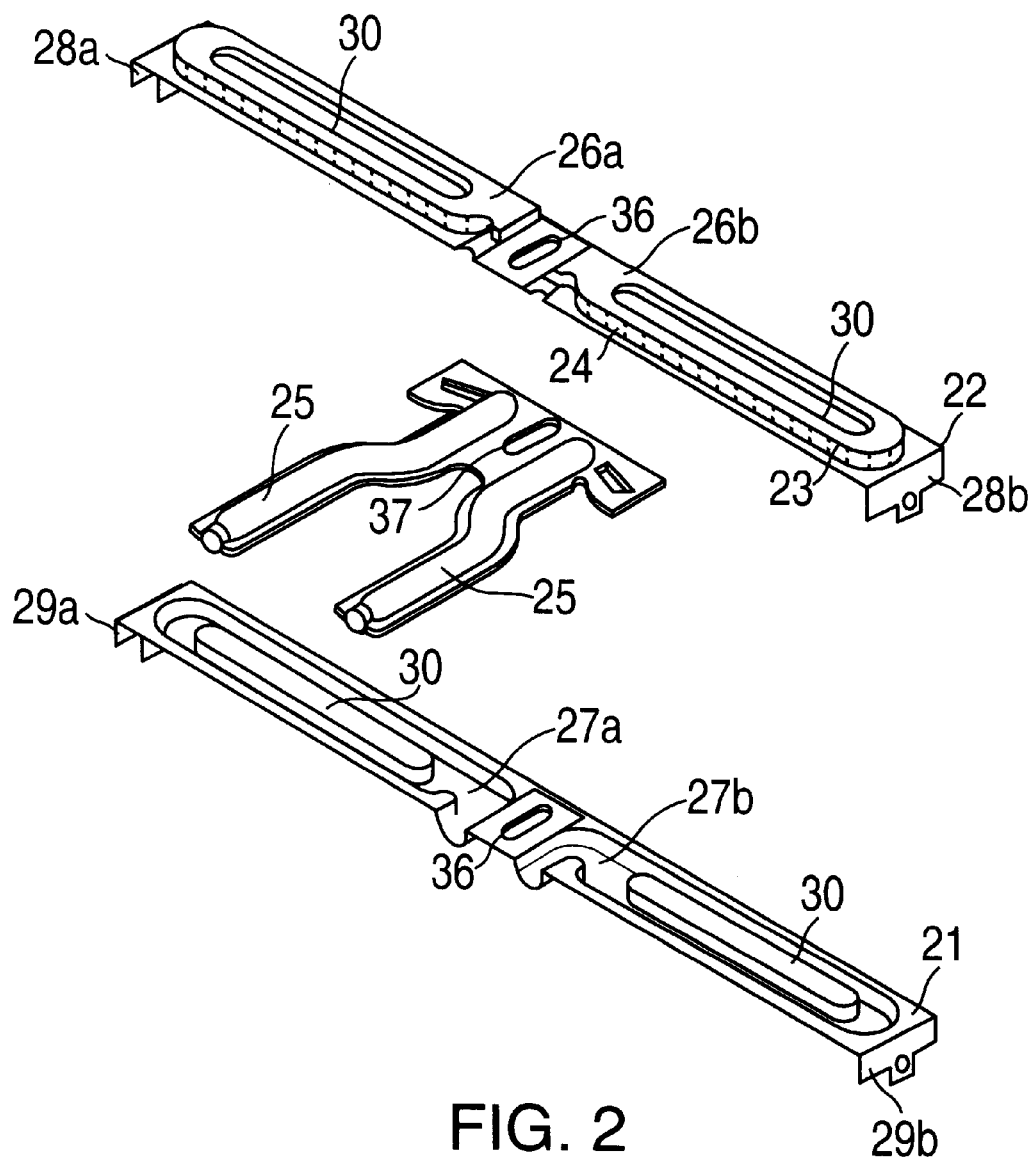
FIG. 2 is an exploded perspective view of the burner assembly of FIG. 1.

The present invention is directed to a burner arrangement for a gas grill. As shown in FIGS. 1–3 an exemplary embodiment of the gas grill comprises a bi-level tent configuration, a burner assembly 1, and a main grill shell 2.

A lower, first tent 3 is generally configured in the shape of the letter "I". A main, central tent segment portion of the first tent 3 comprises a first sloped surface 4 and a second sloped surface 5 which meet along a ridge 6. In the exemplary embodiment shown, the sloped surfaces 4 and 5 are arranged with an angle of approximately 120 degrees therebetween. On each end of the main portion of the first tent 3 is a transverse tent-like structure 7a,b. Each transverse peripheral tent segment 7a,b comprises an outer sloped surface 8a,b and a medial sloped surface 9a,b which meet along a ridge 10a,b. The ridges 10a,b are substantially perpendicular to the central ridge 6. A mounting tab 11a,b for mounting the tent 3 to the grill shell 2 is arranged at a lower end of each sloped surface 8a,b. Each mounting tab 11a,b may comprise a hole for receiving a fastener therethrough. Proximate to the ends of the medial sloped surfaces 9a,b, openings 12a,b,c,d are provide for securing an upper tent structure 15, described below.

The first tent 3 maximizes heat distribution, especially to the corners and to the periphery of the cooking surface. The tent 3 also prevents grease or other food drippings from contacting the burner 1, thus protecting the burner 1 and effectively eliminating or controlling flare-ups. By thus protecting the burner 1, it becomes possible to provide flame ports on the top side of the burner 1, which substantially improves the longevity of the burner.

An upper, second tent 15 comprises a first sloped surface 16 and a second sloped surface 17 on opposite sides of a ridge 18. The second tent preferably comprises a plurality of openings 19 arranged through the first and second sloped surfaces 16 and 17. The openings 19 provide improved heat distribution and allow for controlled flare-ups.

The second tent 15 is arranged over the center section of the lower tent 3 with an air gap therebetween. In the exemplary embodiment shown, the sloped surfaces 16 and 17 are arranged with an angle of approximately 130 degrees therebetween and the tents 3 and 15 are spaced apart at their ridges (e.g., 0.02" to 0.50"). The air gap between the tents 3 and 15 cools the tents, particularly the upper tent 15, which helps control flare-ups. The gap between the tents also prevents drippings and food particulates from becoming trapped between the tents. The arrangement of the second tent 15 over the tent 3 also promotes an even distribution of heat to the cooking surface and allows grease to drain from the cooking surface, thereby reducing flare-ups.

At its corners, the second tent 15 preferably comprises tab extensions 20a,b,c,d. When the tent 15 is placed on the lower tent 3, the tab extensions 20a,b,c,d sit in the openings 12a,b,c,d on the first tent 3. The tent 15 is readily removable from the lower tent 3 such as for cleaning.

The burner assembly 1 will now be described. As shown in FIG. 1, the burner assembly 1 comprises a burner sub-assembly 40 and a venturi sub-assembly 25, each of which is comprised of stamped sheet metal components. As shown in FIG. 2, the burner 1 is assembled by capturing the venturi sub-assembly 25 between upper and lower halves of the burner sub-assembly 40. The lower half of the burner sub-assembly 40 is comprised of a stamped piece of sheet metal 21. The upper half of the burner subassembly 40 is comprised of a complementary piece of stamped sheet metal 22. The two halves are preferably joined by staking or hemming the two pieces together.

The upper piece of sheet metal 22 comprises raised or embossed features 26a and 26b, whereas the lower piece 21 comprises corresponding embossed features 27a and 27b. Each feature 26a,b and 27a,b is formed as a channel arranged in an elongated oval loop. The peripheries of the features 26a and 26b substantially correspond to the peripheries of the features 27a and 27b, respectively. When the two pieces 21 and 22 are joined, the features 26a,b and 27a,b form two hollow burner halves 41a and 41b, as shown in FIG. 1.

As shown in FIG. 2, the features 26a,b of the upper burner portion 22 comprise a plurality of holes or ports 24. The ports 24 preferably are arranged in a plurality of rows on each of the features 26a,b. In one embodiment, a first row of ports 24 is located on side walls of each feature 26a,b and a second row of ports 24 is located above the first row, near the junction of the side walls and a substantially flat top surface of the feature 26a,b. The ports 24 arranged in the second row are preferably smaller than the ports in the first row. Such multi-level porting improves the efficiency of the burner and provides better heat distribution at the cooking surface of the grill. Furthermore, locating the ports 24 on the top side of the burner also improves burner performance and efficiency and substantially improves the longevity of the burner, as compared to conventional burners which are ported on their undersides.

The gas burner sub-assembly 40 also may comprise elongated slot-like openings 30 through the two pieces of stamped metal 21, 22. The elongated slot-like openings 30 provide additional secondary air to enhance the performance of the gas burner assembly 1, in particular improving the burning which occurs through the ports 24 located on or near the essentially horizontal top surfaces of the features 26a,b of the burner subassembly 40.

In the exemplary embodiment shown in FIG. 2, the lower and upper pieces 21 and 22 of the burner sub-assembly 40 comprise tabs 28a,b and 29a,b, respectively, at opposite ends. When the pieces 21 and 22 are joined, the tabs 28 and 29 are joined and may be used to mount the burner 1 to the grill shell 2. As shown in FIG. 1, the grill shell 2 may comprise openings 33 for receiving the tabs 28 and 29.

The gas burner assembly 1 also comprises a venturi sub-assembly 25. As shown in FIG. 3, the venturi sub-assembly 25 preferably comprises two pieces of stamped metal 25t and 26b which are joined, such as by hemming or staking, to form two fuel-air passages, one for each burner half 41a,b. Each passage provides a conduit for providing an air-fuel mixture to each burner half.

Figure 3A:
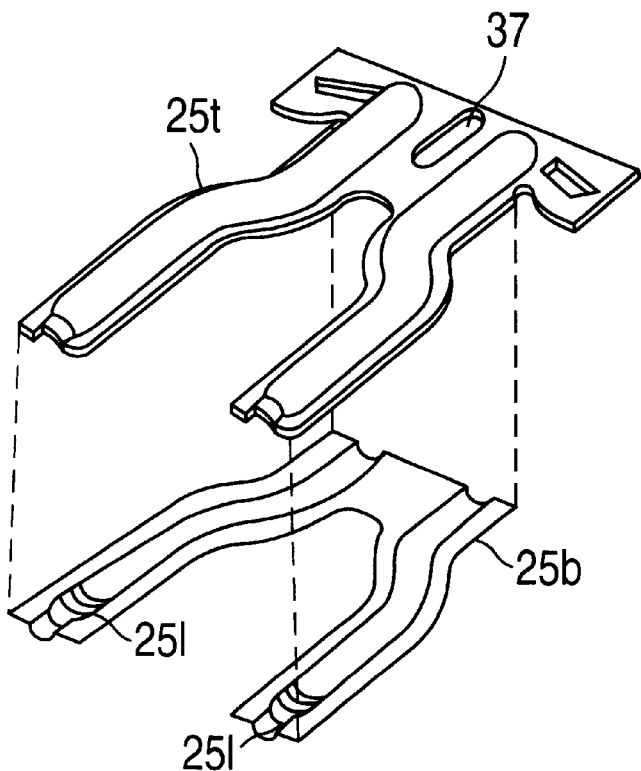
FIG. 3A shows an exploded perspective view of a venturi sub-assembly in accordance with the present invention.
Figure 3B:
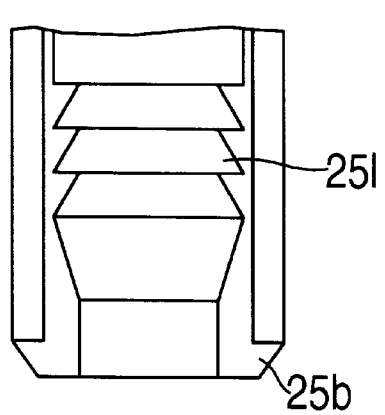
FIGS. 3B and 3C are bottom and side views, respectively, of a portion of the venturi sub-assembly.
Figure 3C:
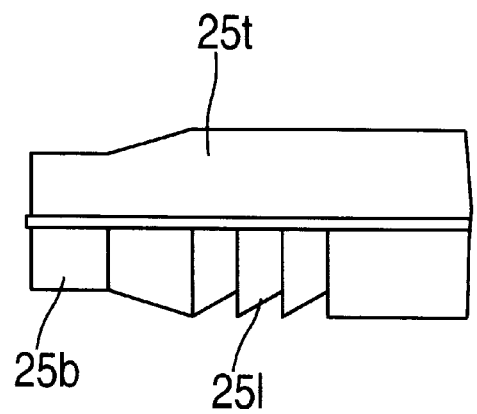

As shown in FIG. 3A and enlarged in FIGS. 3B and 3C, the venturi sub-assembly 25 preferably also comprises louvers 251 proximate to the inlets of the fuel-air passages. The louvers 251 comprise openings which allow primary air to be drawn into the passages. The primary air is mixed with fuel applied to the passage inlets and the fuel-air mixture is conducted to the burner halves where it is combusted. The use of primary air helps make it possible to reduce the volume of the burner. The louvers 251 are preferably arranged on the lower portion 25b of the venturi sub-assembly so as to shelter them from the elements (e.g., wind, rain). Moreover, the louver openings preferably should be sufficiently small so as to prevent insects from entering the passages and nesting in the burner assembly 1.

When the burner assembly 1 is assembled, the venturi sub-assembly 25 is captured between the two pieces 21 and 22 of the burner sub-assembly. The venturi passages align with the burner halves 41a,b thus formed. An opening 37 in the venturi sub-assembly aligns with openings 36 in the pieces 21 and 22 so as to provide an opening in the completed burner assembly 1 for receiving one or more ignitors, as described below.

The stamped metal configuration of the burner assembly 1 allows for reduced manufacturing costs and ease of assembly compared to tubular steel.

Figure 4:
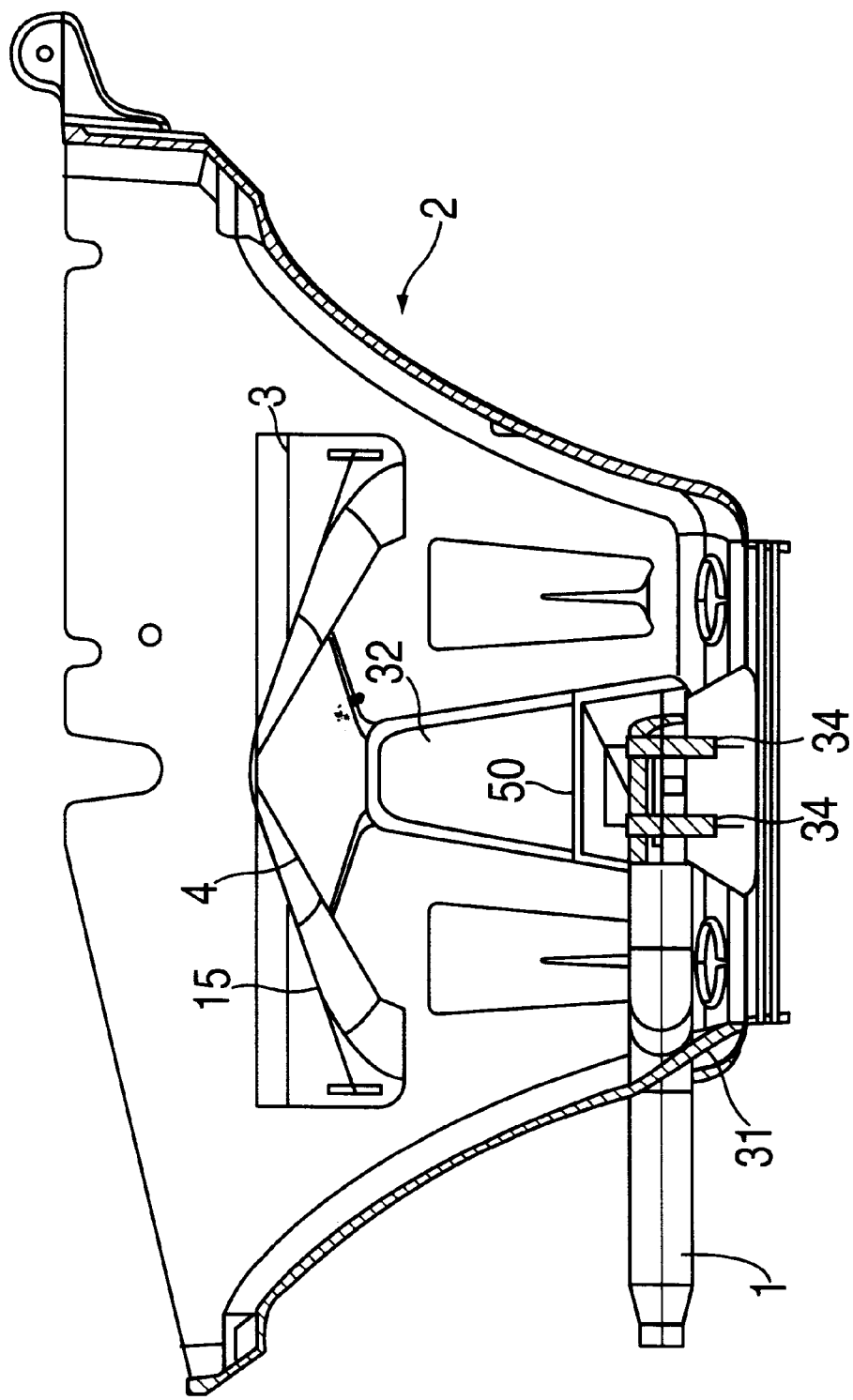
FIG. 4 is a cross-sectional view of the gas grill of FIG. 1.
Figure 6:
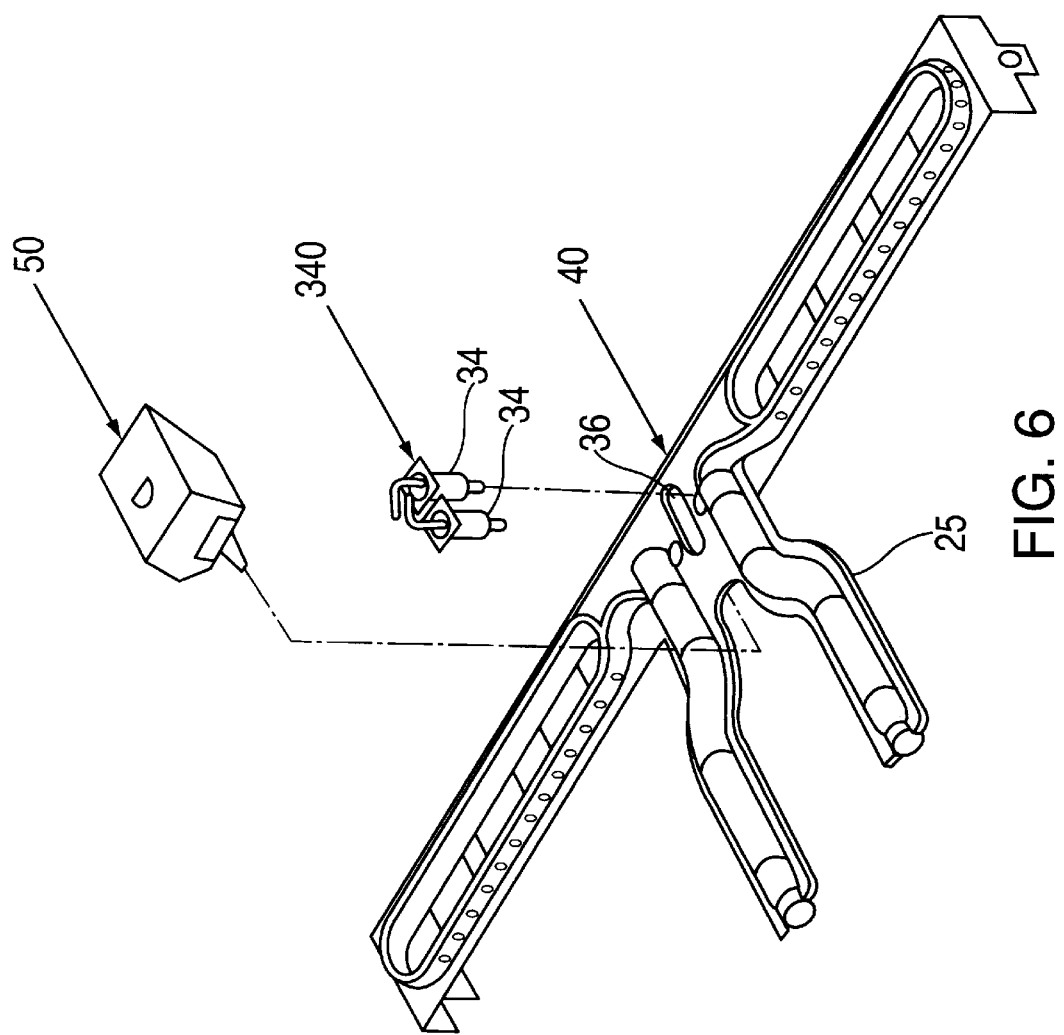
FIG. 6 is a partially exploded perspective view of the burner assembly of FIG. 2 including an ignitor sub-assembly.

As shown in FIGS. 4 and 6, the burner assembly 1 may also comprise an ignitor sub-assembly which preferably is located in the middle of the burner assembly 1. The ignitor sub-assembly may comprise a pair of ignitors 34 placed through an opening 36 located between the burner halves 41a and 41b. For ignition, an arc is developed between the electrodes of the ignitors 34. As shown in FIG. 6, the electrodes of the ignitors 34 are offset, thereby increasing the spacing between the electrodes. The increased spacing results in the generation of longer arcs which improves ignition. Moreover, a collector box 50 is arranged over the electrodes to improve the distribution of gas to the electrodes and to act as a windscreen. As shown in FIG. 4, the box 50 has an open back side which allows gas from the burner halves 41a and 41b to enter the box where it is trapped and ignited by the electrodes 34. To further improve the ignition operation, there may be an increased density of ports 24 on the burner halves 41a,b proximate to the collector box 50. The use of the collector box 50 and the dual ignitors 34 allows consistent, reliable and fast ignition.

Although a dual-burner embodiment has thus far been described, other configurations, such as a single-burner or a three-burner configuration are possible within the scope of the present invention.

The grill shell 2 is generally rectangular comprising two sets of opposing walls and a floor. A front wall 30a comprises one or more openings 31 through which the venturi subassembly 25 may pass. A bottom surface of the shell 2 comprises two rectangular openings 35 which allow secondary air to flow up through the bottom of the shell over the burner 1. The shell 2 may also comprise features for suspending one or more grease catches (not shown) below the openings 35. In the dual-burner embodiment shown it is preferable to provide two smaller catches as opposed to one larger catch so as to provide better grease collection and air flow through the openings 35. The improved air flow helps cool the shell, thereby reducing flare-ups caused by grease trapped in the shell, and improves the provision of secondary air to the burner 1.

The grill shell 2 may comprise a tent pedestal 32 on each end. Each mounting tab 11a,b on the first tent 3 rests on, or alternatively, is attached to a tent pedestal 32, positioning the first tent 3 above the gas burner assembly 1, as shown in FIG. 4.

Figure 5:
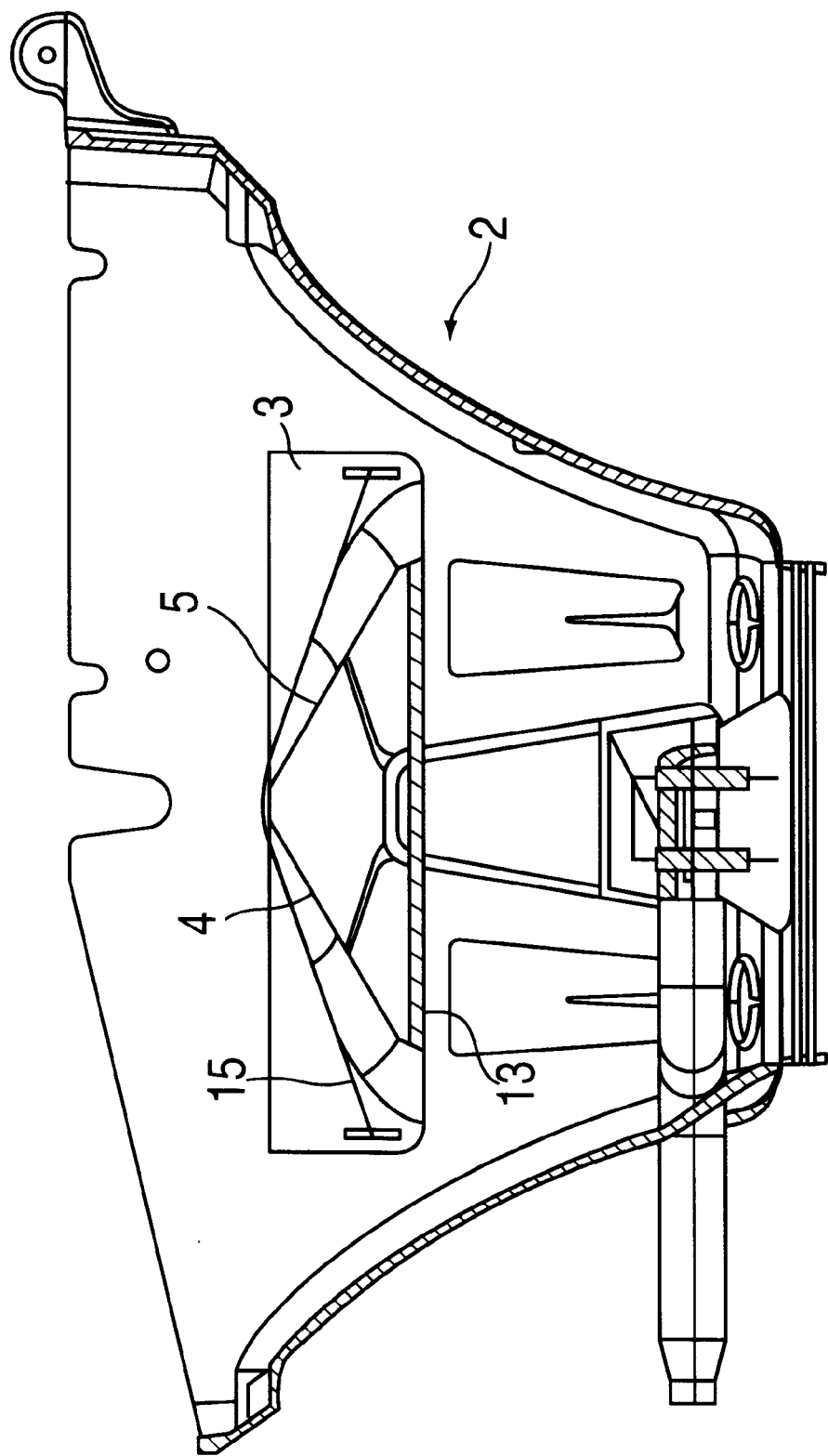
FIG. 5 is a cross-sectional view of a further embodiment of a gas grill of the present invention.

FIG. 5 shows a further embodiment of a grill in accordance with the present invention. In the embodiment of FIG. 5, the tent 3 comprises a horizontal plate 13 arranged at the base of the tent between the sloped surfaces 4 and 5. The plate 13 helps spread the heat generated by the burner, keeping the tent 3 cooler. Additionally, refractory elements, which absorb and re-radiate heat such as ceramic "hot blocks," may be placed between the tent 3 and the plate 13 on the top side of the plate 13, to assist in the distribution of heat.

While several preferred embodiments of a tented gas burner for a grill have been described herein, it is to be understood that variations may be made in the tented gas burner assembly without departing from the spirit and scope of the invention as defined by the appended claims.

What is claimed is:

1. A burner tent comprising:

a central tent segment;

a first peripheral tent segment, the first peripheral tent segment being arranged at a first end of the central tent segment and being substantially perpendicular to the central tent segment; and a second peripheral tent segment, the second peripheral tent segment being arranged at a second end of the central tent segment and being substantially perpendicular to the central tent segment, wherein the central tent segment includes a first sloping side and a second sloping side, the first peripheral tent segment includes a third sloping side and a fourth sloping side, and the second peripheral tent segment includes a fifth sloping side and a sixth sloping side, the first and second sloping sides meeting at a central crest from which the first and second sloping sides slope downward, the third and fourth sloping sides meeting at a first peripheral crest from which the third and fourth sloping sides slope downward, the fifth and sixth sloping sides meeting at a second peripheral crest from which the fifth and sixth sloping sides slope downward, whereby liquid falling on a respective sloping side flows off the respective sloping side.

2. The burner tent of claim 1, comprising a further burner tent, wherein the further burner tent is mounted over the central tent segment and wherein the further burner includes at least two further sloping sides.

3. The burner tent of claim 2, wherein a plurality of openings are arranged on the at least two further sloping sides of the further burner tent.

4. The burner tent of claim 1, wherein the central crest comprises a further surface arranged between the first and second sloping sides of the central tent segment.

5. A burner assembly comprising:
a burner sub-assembly, wherein the burner sub-assembly includes a first embossed sheet metal portion and a second embossed sheet metal portion, the burner sub-assembly having a plurality of openings on at least one of the first and second embossed sheet metal portions; and
a venturi passage sub-assembly, wherein the venturi passage sub-assembly includes a third embossed sheet metal portion and a fourth embossed sheet metal portion,
wherein the venturi passage sub-assembly includes at least one passage and wherein the burner sub-assembly includes at least one hollow chamber, the at least one passage being in fluid communication with the at least one hollow chamber.

6. The burner assembly of claim 5, wherein the venturi passage sub-assembly is attached to the burner sub-assembly by being captured between the first and second embossed sheet metal portions.

7. The burner assembly of claim 5, wherein the first embossed sheet metal portion and the second embossed sheet metal portion are staked together and wherein the third embossed sheet metal portion and the fourth embossed sheet metal portion are staked together.

8. The burner assembly of claim 5, wherein the first embossed sheet metal portion comprises the plurality of openings.

9. The burner assembly of claim 8, wherein the openings are arranged in a plurality of rows.

10. The burner assembly of claim 5, wherein the first and second embossed sheet metal portions each comprise an elongated opening.

11. The burner assembly of claim 5 comprising an ignitor subassembly, the ignitor sub-assembly including at least one ignitor electrode and a collector box, the collector box being arranged over the at least one ignitor.

12. The burner assembly of claim 5, wherein the at least one passage of the venturi passage sub-assembly includes at least one louver.

13. A grill comprising:
a burner assembly;
a first burner tent mounted above the burner assembly; and
a second burner tent mounted above the first burner tent, wherein the first burner tent comprises a central tent segment, a first peripheral tent segment, and a second peripheral tent segment, the first and second peripheral tent segments being substantially perpendicular to the central tent segment and each tent segment including first and second sloping sides and wherein the burner assembly comprises a venturi sub-assembly and a burner sub-assembly, each of which is comprised of sheet metal.

14. The grill of claim 13, wherein the second burner tent includes two sloping sides and a plurality of openings are arranged on the sloping sides of the second burner tent.

15. The grill of claim 13, wherein the burner assembly comprises:
a burner sub-assembly, wherein the burner sub-assembly includes a first embossed sheet metal portion and a second embossed sheet metal portion; and
a venturi passage sub-assembly, wherein the venturi passage sub-assembly includes a third embossed sheet metal portion and a fourth embossed sheet metal portion,
wherein the venturi passage sub-assembly includes at least one passage and wherein the burner sub-assembly includes at least one hollow chamber, the at least one passage being in fluid communication with the at least one hollow chamber.

16. The grill of claim 15, wherein the venturi passage sub-assembly is attached to the burner sub-assembly by being captured between the first and second embossed sheet metal portions.

17. The grill of claim 15, wherein the first embossed sheet metal portion and the second embossed sheet metal portion are staked together and wherein the third embossed sheet metal portion and the fourth embossed sheet metal portion are staked together.

18. The grill of claim 15, wherein the first and second embossed sheet metal portions each comprise an elongated opening.

19. The grill of claim 15, wherein the first embossed sheet metal portion comprises a plurality of openings.

20. The grill of claim 15, wherein the burner assembly further comprises an ignitor subassembly, the ignitor sub-assembly including at least one ignitor electrode and a collector box, the collector box being arranged over the at least one ignitor.

21. A grill comprising
a housing having a length and a width;
a burner located in the housing and extending at least partially over the length of the housing;
a burner tent located above the burner, the burner tent including two sides joined along a central edge and opposing flaps joined to opposing ends of the two sides,
wherein the two sides each extend outward from the central edge partially across the width of the housing and wherein the opposing flaps extend outwardly from the central edge at least partially across the width of the housing further than the two sides.

22. The grill of claim 21, wherein the length of the housing is longer than the width of the housing.

23. The grill of claim 21, wherein the width of the housing is longer than the length of the housing.

24. The grill of claim 21 further comprising a plurality of burners and a plurality of corresponding burner tents.

* * * * *